United States Patent [19]
Miller et al.

[11] Patent Number: 5,516,354
[45] Date of Patent: May 14, 1996

[54] APPARATUS AND METHOD FOR ATOMIZING LIQUID METAL WITH VIEWING INSTRUMENT

[75] Inventors: Steven A. Miller, Amsterdam; Russell S. Miller, Ballston Spa, both of N.Y.; Roy W. Christensen, Northborough, Mass.

[73] Assignee: General Electric Company, Schenectady, N.Y.

[21] Appl. No.: 236,828

[22] Filed: May 2, 1994

Related U.S. Application Data

[62] Division of Ser. No. 37,848, Mar. 29, 1993, abandoned.

[51] Int. Cl.$^6$ ..................................................... B22F 9/08
[52] U.S. Cl. ................................. 75/338; 264/12
[58] Field of Search .................. 75/338, 339; 264/12

[56] References Cited

U.S. PATENT DOCUMENTS

| | | | |
|---|---|---|---|
| 4,484,059 | 11/1984 | Lillquist | 219/130.01 |
| 4,619,845 | 10/1986 | Ayers et al. | 427/922 |
| 4,631,013 | 12/1986 | Miller | 425/7 |
| 4,656,331 | 4/1987 | Lillquist et al. | 219/121 PL |
| 4,687,344 | 8/1987 | Lillquist | 374/124 |
| 4,778,516 | 10/1988 | Raman | 425/7 |
| 4,780,130 | 10/1988 | Raman et al. | 425/7 |
| 4,801,412 | 1/1989 | Miller | 264/12 |
| 5,047,612 | 9/1991 | Savkar et al. | 219/121.47 |
| 5,244,369 | 9/1993 | Miller et al. | 75/338 |
| 5,268,018 | 12/1993 | Mourer et al. | 75/338 |
| 5,423,520 | 6/1995 | Anderson et al. | 266/202 |

FOREIGN PATENT DOCUMENTS 61-227106  10/1986  Japan ......................................... 75/338

OTHER PUBLICATIONS

"The Intelligent Control of an Inert-Gas Atomization Process", SA Osella, SD Ridder, FS Biancaniello, PI Espina, JOM, pp. 18–21, Jan. 1991.

"Flow Mechanisms in High Pressure Gas Atomization", IE Anderson, RS Figliola, H. Morton, Materials Science and Engineering, A148 (1991) pp. 101–114.

*Primary Examiner*—George Wyszomierski
*Attorney, Agent, or Firm*—R. Thomas Payne; James Magee, Jr.

[57] ABSTRACT

An apparatus and method for atomizing liquid metal are disclosed. A liquid metal supply is coupled to a nozzle for atomizing a stream of liquid metal in an atomizing zone extending from the nozzle. A viewing instrument provides a field of view extending to the atomization zone. A sensor coupled with the viewing instrument generates an image of the atomizing zone, and a control adjusts a flow rate of the stream responsive to the image.

28 Claims, 8 Drawing Sheets

APPARATUS AND METHOD FOR ATOMIZING LIQUID METAL WITH VIEWING INSTRUMENT

This application is a division of application Ser. No. 08/037,848, filed 03/29/93, now abandoned.

This application is related to applications Ser. No. 997,739, Ser. No. 997,740, Ser. No. 997,742, Ser. No. 997,743, and Ser. No. 997,752 (now U.S. Pat. No. 5,244,369), all filed 12/30/92.

This invention relates to an apparatus and method for atomizing liquid metal.

BACKGROUND OF THE INVENTION

Close coupled gas atomization of liquid metal is being developed as a process for forming metal powders. The close coupled gas atomization process is performed by a nozzle comprised of a melt guide tube extending axially through a cylindrical gas plenum. The cylindrical gas plenum has an inner chamber in communication with an annular orifice, or an annular array of discrete orifices, so that a gas flow therethrough produces an atomizing gas jet which may be comprised of an array of discrete jets. The gas jet has a conical shape converging below the melt guide tube. A stream of liquid metal passing through the melt guide tube and exiting therefrom is atomized by the conical gas jet converging in the stream.

When the gas atomization of liquid metal is commenced, there is an opportunity to view the atomization of the liquid metal from viewports in the atomization chamber. In the atomization process, the atomizing gas flows at supersonic speeds resulting in great scattering and recirculation of the particulate formed by the atomization process. Soon after the atomization starts producing powdered material, recirculating powder from the atomization process obscures the view. In fact, the observation of the atomization nozzle is obscured within seconds after the process is started.

Information regarding the interaction between the atomizing gas and the liquid metal in an atomization zone below the nozzle can be obtained at the start of the atomization process, and before the viewing path to the atomization zone is obscured by the recirculating powder produced by the atomization process. However, it has not been possible to view the atomization process for more than a few seconds after the atomization has begun. The ability to observe the interaction that occurs in the atomizing zone at and below the nozzle tip is lost. For example, one problem that can occur during the atomization process is liquid metal freezing in the melt guide tube, herein referred to as freeze-off. Often the freeze-off cannot be predicted or prevented resulting in undue delay and losses in the atomization process.

Several important properties of metal powder, and the products formed from consolidation of the powder, are dependent on the as-atomized particle size. These properties include composition homogeneity, mechanical performance, e.g. strength, and toughness, as well as physical characteristics of the powder itself, e.g., particle shape, porosity, and flow qualities. Most of these properties improve as particle size decreases, however, powder handling becomes more complicated for finer powder because of caking, environmental contamination, pyrophorosity and other affects.

The strong dependence of properties on particle size translates into an increased demand for atomization process control that provides a predetermined particle size range, and minimizes the production of powder having a particle size above or below the predetermined range. At the same time, a number of variables necessarily change during the atomization process, such as the flow rate of molten metal through the nozzle as the static head pressure of the liquid metal in the crucible changes, temperature increase or decrease, and nozzle wear or constriction. As a result, a series of adjustments can be required during the atomization process in response to the changing variables. We have found that atomization process control can be improved by viewing the interaction of the atomizing gas jet and the liquid metal stream in the atomization zone. Such viewing can also be used to improve the prevention of freeze-off in the atomization nozzle.

U.S. Pat. No. 4,656,331, discloses an infrared sensor suitable for use in detecting the temperature of particles entrained in a plasma spray jet. The sensor is used to control the electrical power input to the plasma torch to heat the particles to their melting temperature prior to impact on a target substrate. U.S. Pat. No. 5,047,612, discloses an apparatus having an infrared sensor for controlling the deposition of a powder in a plasma spray process. A control means responsive to the infrared sensor selectively adjusts a carrier gas flow rate in a powder injection means for the plasma spray apparatus to selectively move the location of a powder impact point on a target. The infrared sensor generates an image representative of a temperature distribution of the powder deposited on the target, the sensor having means for identifying a location of an impact point of the powder upon the target.

An aspect of this invention is to provide an apparatus and method for monitoring and controlling the liquid metal atomization process.

Another aspect of the invention is to provide an apparatus and method for controlling the liquid metal atomization process by viewing the atomization zone, and adjusting as necessary one or more parameters, including the atomization gas pressure, to prevent freeze-off in the melt guide tube or provide a preselect powder size.

BRIEF DESCRIPTION OF THE INVENTION

The apparatus of this invention for atomizing liquid metal is comprised of a liquid metal supply for providing a stream of liquid metal to a nozzle coupled thereto for atomizing the stream in an atomizing zone extending from the nozzle. A viewing instrument for providing a field of view extending to the atomization zone. A sensor coupled with the viewing instrument for generating an image of the atomizing zone, and a control for adjusting a flow rate of the stream.

The method for atomizing liquid metal comprises, atomizing a stream of molten metal in an atomizing zone. Providing a field of view extending to adjacent the atomizing zone. Generating an image of the atomizing zone from a position in the field of view, and selectively adjusting a flow rate of the stream responsive to the image.

As used herein, the term "image" or "imaged" means a visual display such as a liquid crystal display or video monitor, or digitized data in a processor such as a computer.

BRIEF DESCRIPTION OF THE DRAWINGS

The following description of the invention will be understood with greater clarity if reference is made to the following drawings.

DETAILED DESCRIPTION OF THE INVENTION

We have found that the atomized metal droplets formed by the close coupled atomization nozzle form a finite plume. In addition, we have discovered that a viewing instrument can be positioned adjacent the plume to provide a view of the atomization zone, without intruding into the plume. As a result, a view of the atomization zone during the atomization process can be obtained despite the recirculating particles in the atomization enclosure. Further, it has been found that images of the atomization zone obtained through the viewing instrument provide information characteristic of the atomization process. As a result, process control's can be adjusted in response to the atomization images, for example, to prevent freeze-off, or provide a preselect powder size.

Figure 1:
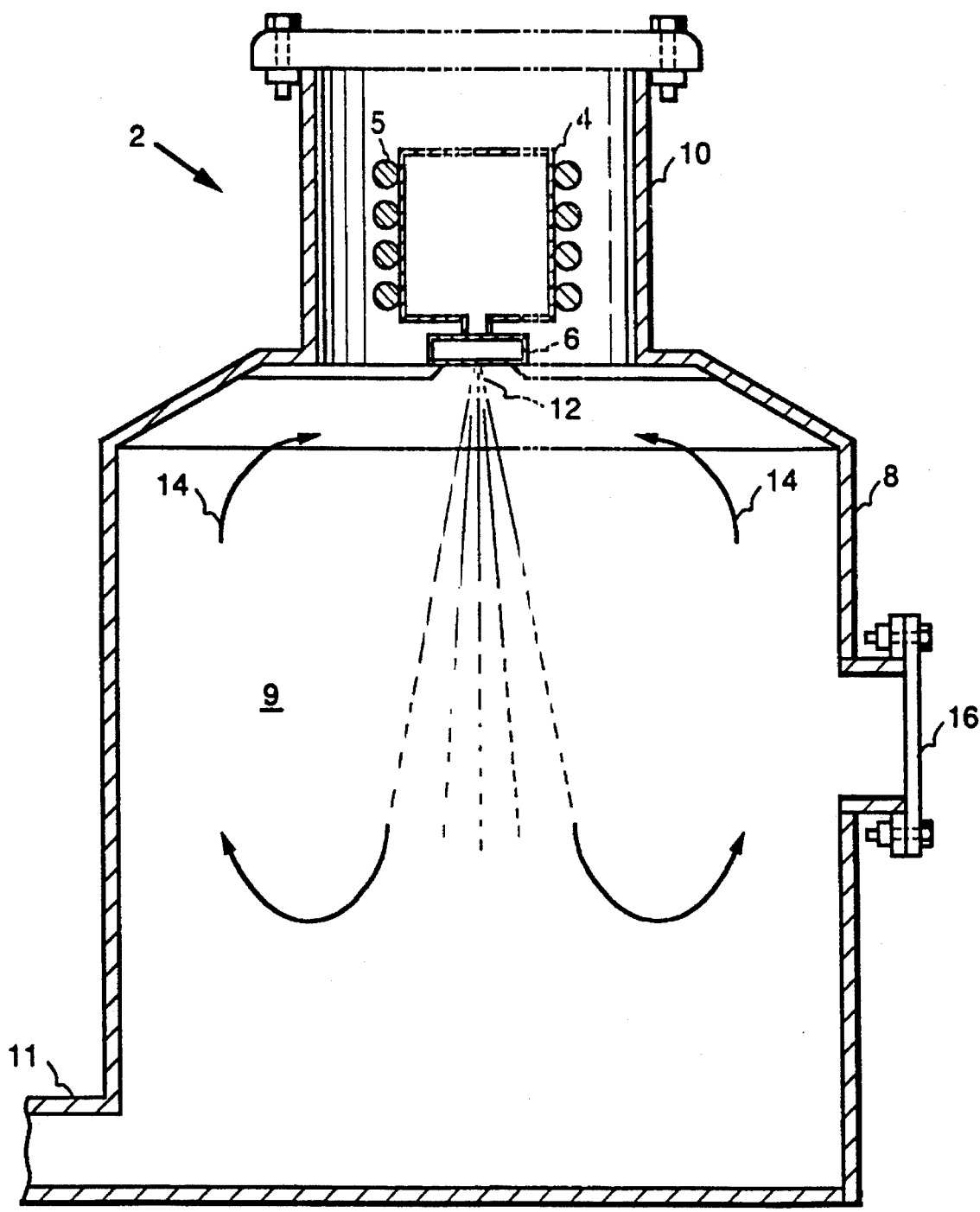
FIG. 1 is a schematic view of an apparatus for atomizing liquid metal.

Referring to FIG. 1, an apparatus 2 for atomizing liquid metal is shown. The apparatus 2 is comprised of a crucible 4, a nozzle 6, and an enclosure 8. The crucible 4 is formed of suitable material for holding the liquid metal, e.g. ceramic such as alumina or zirconia, or water cooled copper. A conventional heating means such as element 5 can be positioned for heating the molten metal therein. The molten metal in crucible 4 can be heated by any suitable means, such as an induction coil, plasma arc melting torch, or a resistance heating coil. The crucible 4 has a bottom pouring orifice coupled with a melt guide tube in nozzle 6. The crucible 4, and nozzle 6 are conventionally mounted on atomization enclosure 8.

The atomization enclosure 8, formed from a suitable steel, is configured to provide an inner chamber 9 suitable for containing the atomization process. Depending upon the metal being atomized, enclosure 8 can contain an inert atmosphere or vacuum. A suitable crucible enclosure 10 can be formed over the crucible 4 to contain an inert atmosphere for the liquid metal. A conventional vacuum pump system, not shown, or gas supply, not shown, are coupled with atomization enclosure 8 and crucible enclosure 10 to provide the inert atmosphere or vacuum therein. A conventional exhaust system, not shown, for example with cyclone separators, is coupled with enclosure 8 at connection 11 to remove the atomized powder during the atomization process.

A stream of liquid metal from crucible 4 is atomized by the nozzle 6, forming a plume of molten metal droplets 12 which are rapidly quenched to form solid particulates of the metal. Suitable nozzles are shown, for example, in U.S. Pat. Nos. 4,801,412, 4,780,130, 4,778,516, 4,631,013, and 4,619,845, incorporated herein by reference. The nozzle 6 directs a stream of liquid metal into a supersonic jet of atomizing gas having a conical shape that converges in the melt stream. The high kinetic energy of the supersonic atomizing gas breaks up the stream of liquid metal into atomized droplets which are widely dispersed in the atomization enclosure. As a result, within several seconds of the initiation of atomization, the atomization vessel is filled with a cloud of recirculating powder particulates, for example shown by arrows 14. While atomization of the liquid metal stream can be viewed at the initiation of atomization, for example from view port 16 mounted on atomization enclosure 8, the interaction between the atomizing gas jet and the liquid metal stream is obscured by the cloud of metal particulates within a few seconds.

Figure 2:
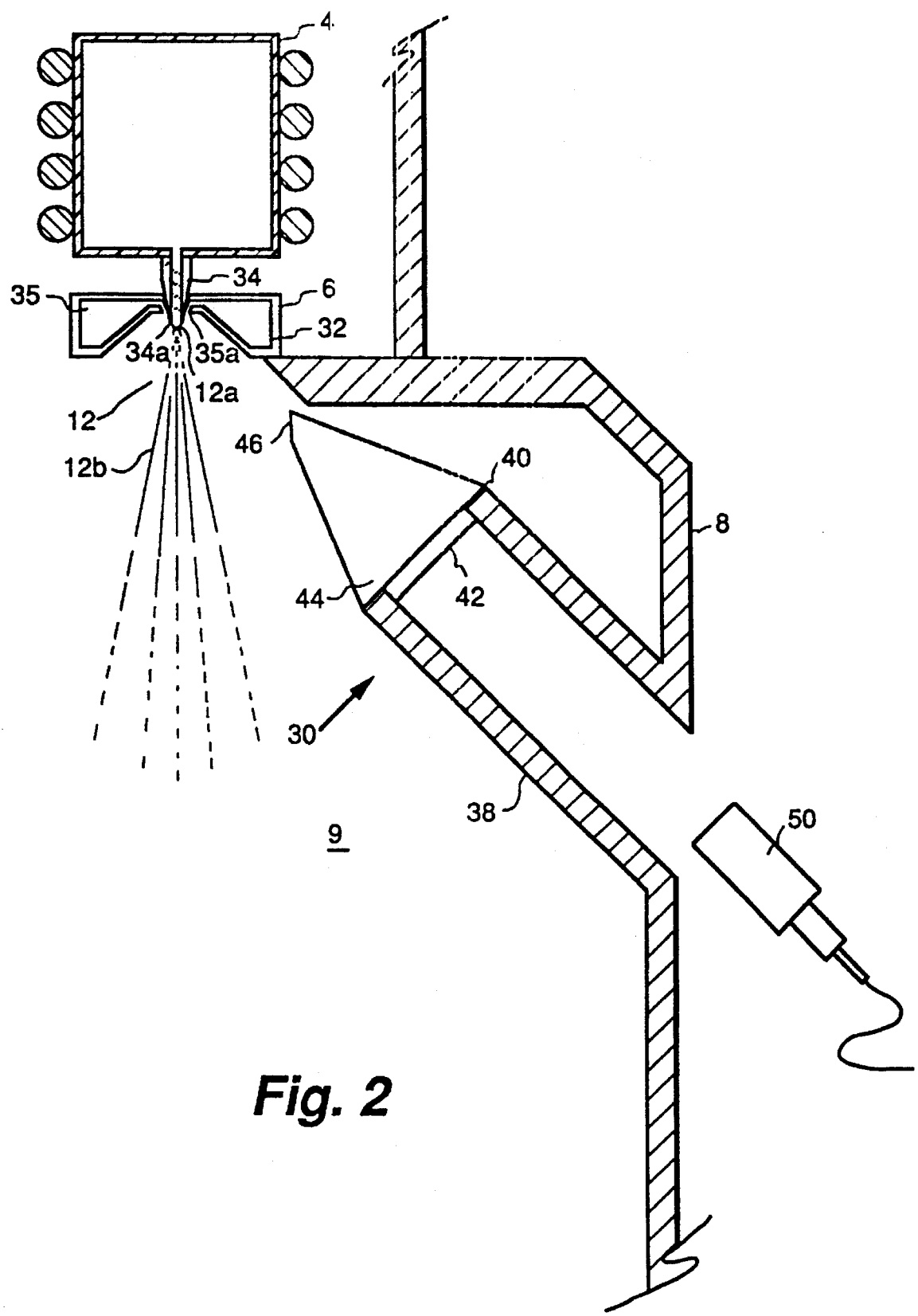
FIG. 2–4 is a schematic view of a viewing instrument for viewing the atomization of liquid metal.

The apparatus and method of this invention are shown by making reference to FIGS. 2–6. FIG. 2 shows an atomizing apparatus having common elements identified with the same number as in FIG. 1. A viewing instrument 30 for viewing the atomization process extends through the enclosure 8. The viewing instrument 30 extends through the atomization enclosure 8 to a viewing orifice 46 adjacent the atomizing zone 12. The viewing orifice 46 should not extend into the atomizing zone, i.e. the plume of atomized droplets and supersonic atomizing gas jet. For example, in the atomizing apparatus shown in FIG. 2 it was found that the viewing orifice 46 could extend to a position at least about 15 degrees, and about 20 millimeters from the axis of the atomized plume. Preferably, the viewing orifice 46 is positioned about 30 to 60 degrees, and about 20 to 50 millimeters from the axis of the atomized plume.

Briefly described, one suitable nozzle 6 is comprised of a cylindrical plenum 32 and a melt guide tube 34 extending axially therethrough to a melt exit orifice 34a. A stream of liquid metal is poured through the melt guide tube 34 extending from the bottom pouring orifice in the crucible 4. The plenum 32 defines an inner chamber 35 coupled with an annular atomizing gas orifice 35a spaced from the exit orifice 34a and configured to provide a jet of atomizing gas having a conical shape converging in the stream in the atomizing zone 12 extending from the exit orifice 34a. A gas inlet, not shown, extends through the plenum in communication with the inner chamber 35. The gas inlet is coupled with a conventional gas supply, not shown, to provide the atomizing gas, such as argon, to the inner chamber 35.

The atomizing zone 12 includes the exit orifice 34a at the tip of the melt guide tube 34 and extends therefrom, for example, for a distance of up to about 20 exit orifice diameters. The atomizing zone typically includes a first section 12a where the stream of liquid metal extends from the exit orifice 34a. In a second section 12b, the liquid metal stream interacts with the gas jet emitted from the atomization gas orifice, and the stream breaks up or atomizes. The atomizing zone is characterized by a high kinetic energy from the atomization gas jet, which can be at supersonic speeds, and the plume of atomized liquid metal droplets.

The viewing instrument 30 is configured to extend through the chamber to provide a protected field of view extending to the atomizing zone 12. When a vacuum or protective atmosphere is maintained in the enclosure 8, the viewing instrument is formed with a window to provide a hermetic seal therein having a transparent window for the field of view to extend through. However, when atomization of metal is performed that does not require a protective atmosphere or vacuum, the viewing instrument can be formed so that atmosphere within the chamber 9 is in communication with the ambient outside of the enclosure 8.

For example, the viewing instrument 30 can be comprised of a cylindrical sleeve extending through the enclosure to the viewing orifice adjacent the atomizing zone. To maintain a vacuum in the enclosure 8, the viewing instrument 30 can be comprised of a cylindrical first sleeve 38, a transparent window 42, and a second sleeve 44. The sleeve 38 extends through the enclosure 8 to a first end 40 within the chamber 33. The window 42 is mounted with conventional fasteners and a gasket to hermetically seal the first end 40. The window 42 is formed from a transparent material such as silica glass, Lucalox polycrystalline alumina, polycrystalline yttria for example shown in U.S. Pat. No. 4,755,492, and single crystal alumina or zirconia.

The second sleeve 44 is mounted on the first end 40, and extends therefrom to the viewing orifice 46 spaced from the atomizing zone 12. Preferably, the second sleeve 44 is formed to have a conical shape narrowing at the viewing orifice 46. The second sleeve 44 can be formed from a suitable metal sheet, such as steel or aluminum, that is rolled and spot welded to form the cylindrical or conical shape. Preferably, the second sleeve 44 extends at least about 30 centimeters from the window 42 so that recirculating particles entering the viewing orifice fall to the bottom of the second sleeve before hitting the window. The second sleeve 44 is mounted on first end 40, for example by extending the second sleeve around first sleeve 38 and securing thereto with a conventional fastener such as a clamp.

The viewing orifice 46 is of a suitable size, for example about 10 to 40 millimeters in diameter, to provide a view of the atomizing zone 12 from within the first sleeve 38. A sensor 50 for generating an image of the atomization zone, such as a CID or CCD video camera, can be mounted on the enclosure 8, or within the first sleeve 38, so that the field of view of the sensor 50 extends through the window 42. The sleeve 38 and second sleeve 44 being positioned to extend through enclosure 8 so that the field of view of sensor 50 extends through the atomizing zone 12.

The first sleeve can be formed with a first section extending from the enclosure, and a second section extending to the first end 40. The second section extending into the first section to provide for axial adjustment of the position of the first end 40. A conventional flange having a gasket is conventionally mounted, for example with mating threads, to provide for axial adjustment and hermetic sealing between the first and second sections.

Recirculating powder particles from the atomization process can enter the second sleeve 44 through viewing orifice 46 and deposit on window 42 or scratch the window obscuring the view from within the first sleeve. Preferably, a gas purge, not shown, is mounted in the second sleeve to sweep the particulate from the transparent window, and out of the second sleeve. A suitable gas purge can be formed by extending a tube into the second sleeve 44. The tube is operatively coupled with a conventional gas supply, and the tube is positioned in the second sleeve to direct a flow of inert gas across window 42 to sweep the particulate therefrom. For example, it was found an argon flow rate of 1.5 Kg/min. from the tube was suitable to keep the window clean during atomization of a steel alloy. Preferably, the second sleeve 44 is formed with a bore to allow the purging gas and atomized particles to pass therefrom.

Other embodiments of the viewing instrument used in the method and apparatus of this invention are shown in U.S. patent applications Ser. No. 07/997,740, Ser. No. 07/997,739, and Ser. No. 07/997,752, incorporated herein by reference.

Figure 3:
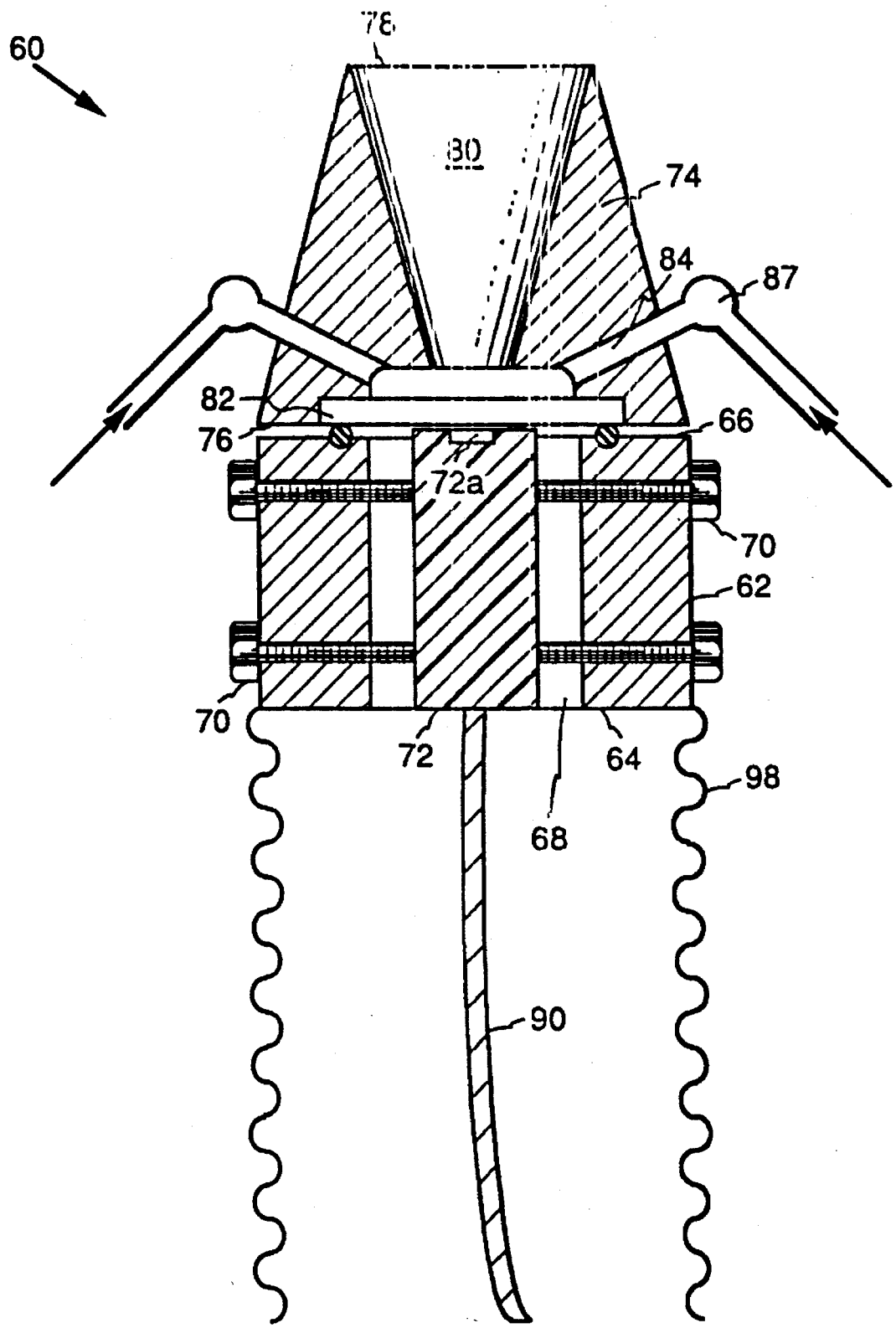

Briefly described, another viewing instrument is shown by referring to FIG. 3. The viewing instrument 60 is comprised of an annular housing 62 extending from a first end 64 to a second end 66 defining an inner channel 68. Conventional fasteners 70 extending through mating threaded bores in housing 62 secure a camera 72 therein to have a field of view extending from the second end 66. A sleeve 74, extends from a third end 76 to a fourth end 78 defining a second inner channel 80. The sleeve 74 is mounted on the housing 62 so the field of view of the camera 72 extends through second channel 80, and the third end 76 faces second end 66. A transparent window 82 is positioned between the housing 62 and the sleeve 74, and mounted to seal the first channel 68 from the second channel 80. Conventional lensing for the camera 72 can be positioned at a front end 72a of the camera, or the transparent window 82 can be formed as the lensing for the camera.

The sleeve 74 is formed with a passage 84 extending through the sleeve in communication with the window 82. A tube or tubes 87 are mounted to extend into the passage 84 and are operatively coupled to a conventional gas supply not shown. The passage 84 is configured so that a gas flow passing from the tubes 87 into the passage 84 directs a stream or jet of gas from the window 82 towards the fourth end 78 of sleeve 74. The gas flow or jet through the second channel 80, protects the transparent window 82 from atomized particles depositing on, scratching, or otherwise damaging the window. The viewing instrument 60 can be mounted on a bracket in the atomizing enclosure so that the sleeve 74 is spaced from the atomizing zone, and the field of view from the camera within the housing 62 extends through the atomizing zone. A flexible sleeve 88 extends from the first end 64 to the enclosure to protect the camera cord 90.

Figure 4:
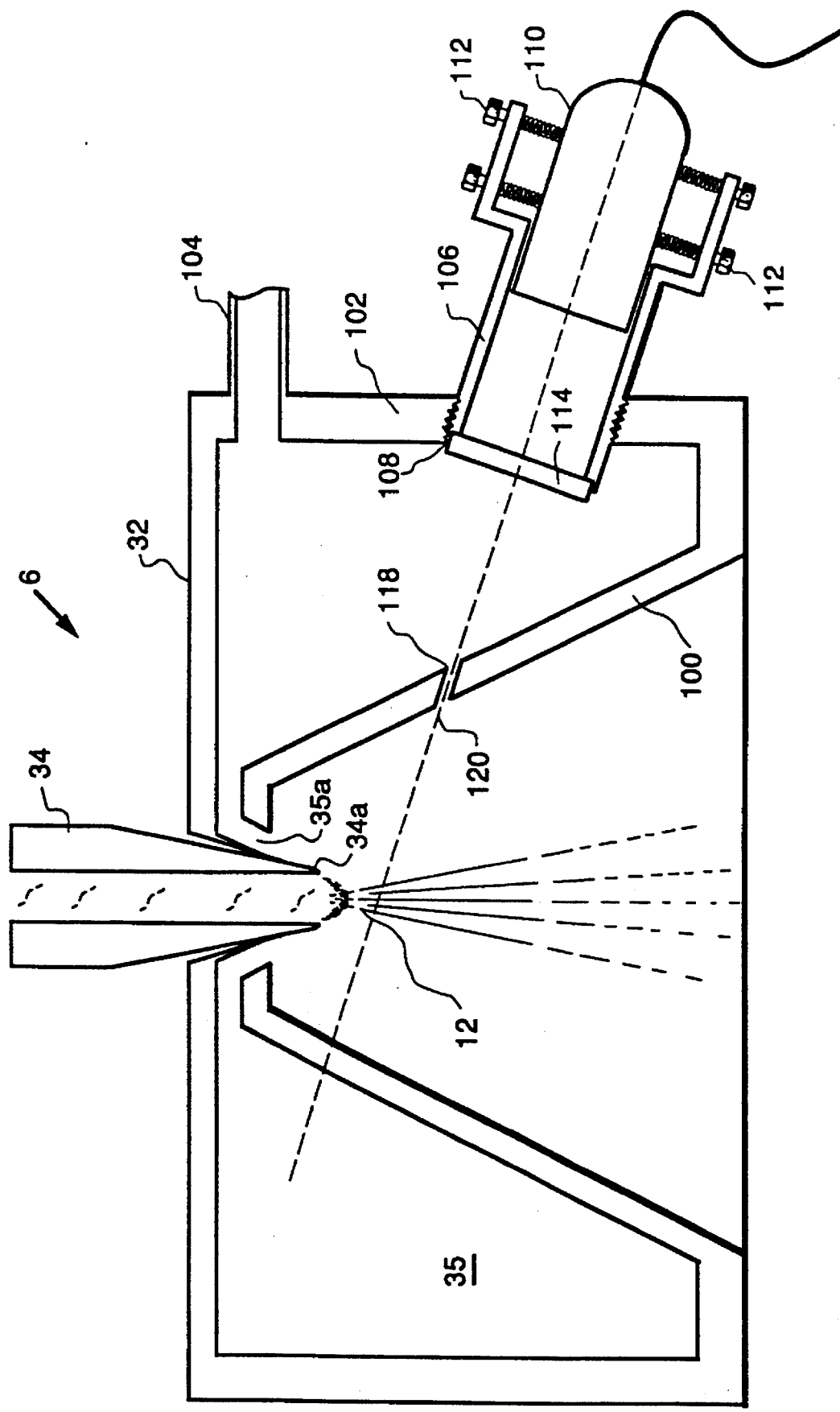

Another embodiment of a viewing instrument that can be used in the method and apparatus of this invention is shown by making reference to FIG. 4. The nozzle 6 is comprised of the cylindrical plenum 32, and the melt guide tube 34 extending axially therethrough to the melt exit orifice 34a. The plenum 32 defines the inner chamber 35 coupled with the annular atomizing gas orifice 35a spaced from the exit orifice 34a and configured to provide an annular jet of atomizing gas converging in the atomizing zone 12 extending from the exit orifice 34a. The plenum 32 is configured with a cylindrical inner sidewall 100 extending below the exit orifice 34a and spaced from the atomizing zone 12. The inner sidewall 100 extends to a cylindrical outer sidewall 102. A gas inlet tube 104 extends through the outer sidewall 102, and is coupled with a conventional gas supply, not shown, to provide an atomizing gas to the inner chamber 35.

The viewing instrument comprises the nozzle 6 having a cylindrical sleeve 106 extending through the outer sidewall 102 to a first end 108 in communication with the inner chamber 35. A camera 110 is mounted by conventional fasteners 112 in the sleeve to have a field of view 120 extending from the first end 108. The sleeve 106 is positioned so that the field of view 120 of the camera 110 can extend through the atomizing zone 12. A transparent window 114 is mounted to seal the first end 108 of the sleeve 106. A porthole 118 is formed in the inner sidewall 100 along the field of view 120 of camera 110 to provide a view of the atomizing zone through the inner wall 100.

For example, the porthole can be formed as a bore in the inner sidewall 100 along the field of view of camera 110 to provide a view of the atomizing zone 12 to camera 110. Atomizing gas at a high pressure in the chamber 35 flows from the porthole 118, and interacts with recirculating powder particles that can be directed down the porthole. The flow or jet of gas emitted from the porthole blows the powder particles back out of the porthole before the powder can reach the transparent window 114. The flow or jet of gas from the porthole prevents powder from contaminating, e.g., pitting, scratching, or depositing on the transparent window 114.

The image of the atomizing zone can be any image that can be formed from the reception of electromagnetic radiation emanating or reflected from the atomizing zone. For example, the infrared wavelengths from the liquid metal can provide temperature information, and the visible wavelengths from luminescent liquid metals can provide visual information that can be used to image the atomization zone. The sensor can be any conventional apparatus for generating the image, such as a video camera, pyrometer, or imaging radiometer, for example shown in U.S. Pat. Nos. 4,687,344, or 4,656,331, incorporated herein by reference. The imaging radiometer can provide a temperature profile, or map of the atomizing zone with an associated visual image.

Preferred commercially available video cameras are miniature CCD based S-VHS or VHS cameras having high speed electronic shutters. Examples of commercially available video cameras are the Toshiba IKM-30A, M-40A, and IKM-M30MA, and the Sony XC-77RRCE and SC-RRCE. Such cameras can have a diameter of 3 centimeters or less, and a length of about 6 centimeters or less complete with the associated lensing. As a result, the camera can be positioned in a small space. Conventional lensing for the camera can be positioned at a front end of the camera, or the transparent window in the viewing instrument, e.g. discussed above, can be formed as the lensing for the camera. An example of suitable conventional lenses for the miniature cameras are microminiature lenses, such as, Toshiba models JK-L04, JK-L7.5, JK-L15, and JK-L24.

The sensor provides an output signal that can be used to generate the image of the atomization zone. The output signal can be sent to a display, or sent to a processor such as a computer to analyze and compare the image to a predetermined reference pattern or patterns. In one embodiment the sensor is a pyrometer which outputs a voltage signal corresponding to a temperature or series of temperatures in the atomizing zone. The voltage signal can be sent to a display such as a liquid crystal to display the temperature or series of temperatures to provide a thermal profile of the atomizing zone. In addition, the voltage signal can be sent to a processor such as a computer where it is digitized and compared to a predetermined reference value or values to determine if there is a deviation larger than a given amount. If such a deviation exists the computer is used to send control signals to adjust the flow rate of the liquid metal stream in order to bring the sensed temperature back within the limits of the predetermined reference values. It should be understood that the voltage signal can be sent to the display or the processor, or both.

Figure 5:
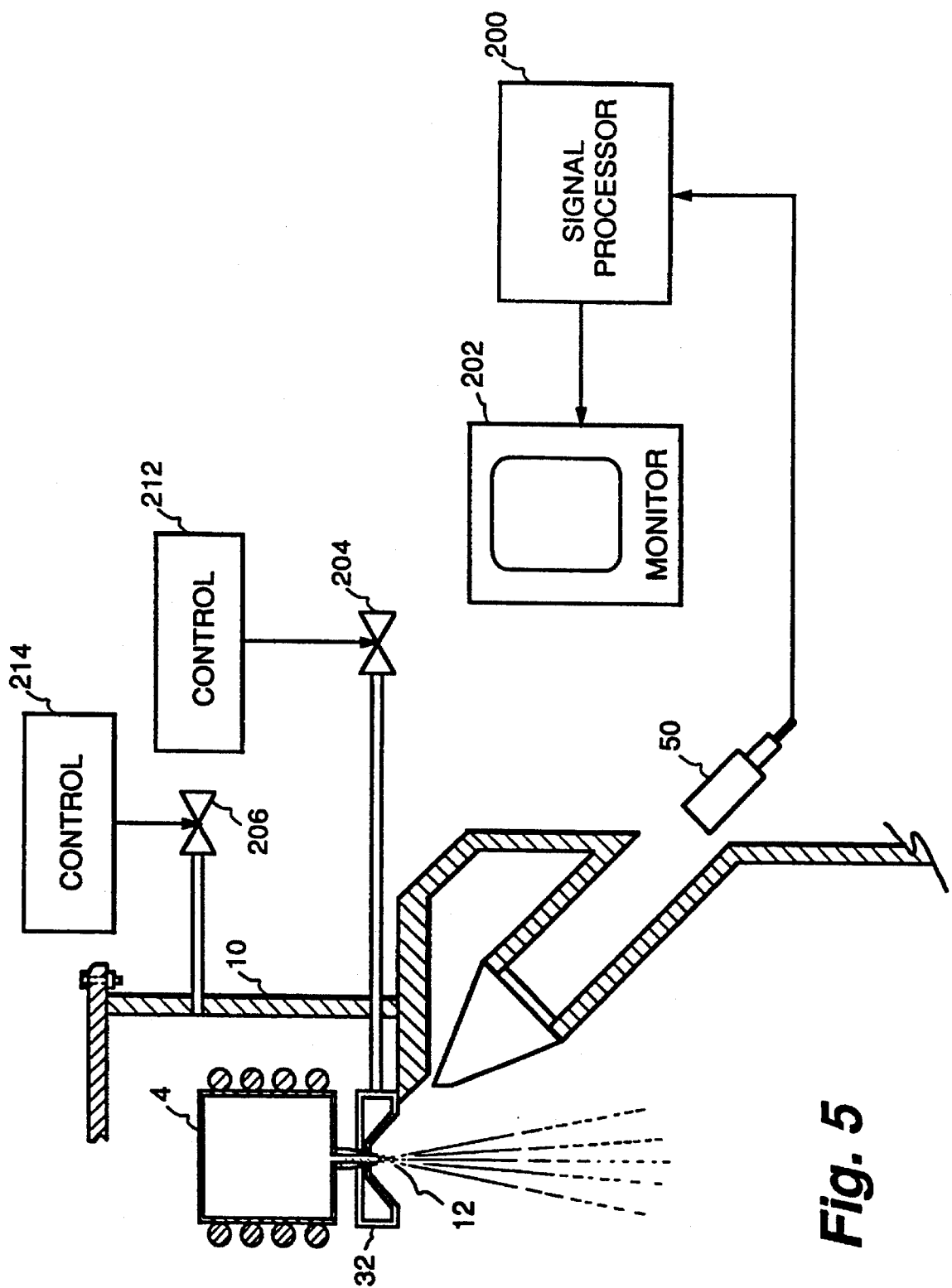
FIGS. 5 and 6 are each a schematic view of an apparatus for atomizing liquid metal having a control for the process.

Referring to FIG. 5, in a more preferred embodiment the sensor 50 is a video camera which can provide the standard EIA RS-170 composite signal (525 line, 60 Hz, 2/1 interlace), and the video signal can be sent to a video monitor 202 to display an image of the atomizing zone 12. The video signal can be processed further to display more information. For example, when the camera 50 is configured as an imaging radiometer, the video signal can be sent to a video signal processor 200 prior to display on the video monitor 202. In a preferred embodiment, the video signal processor is an analog video analyzer such as the Colorado Video Model 321 Video Analyzer, Boulder, Co., for example, providing a continuous graphical display of signal intensity, i.e., atomizing zone temperature, along a user-selected cursor as well as additional signal outputs useful for further processing. The user positioned cursor intersects the image of the atomizing zone 12 along a section line, and the temperature variations along the cursor line are displayed. The video signal can also be sent to a video recorder to provide a record of the atomizing process.

Figure 6:
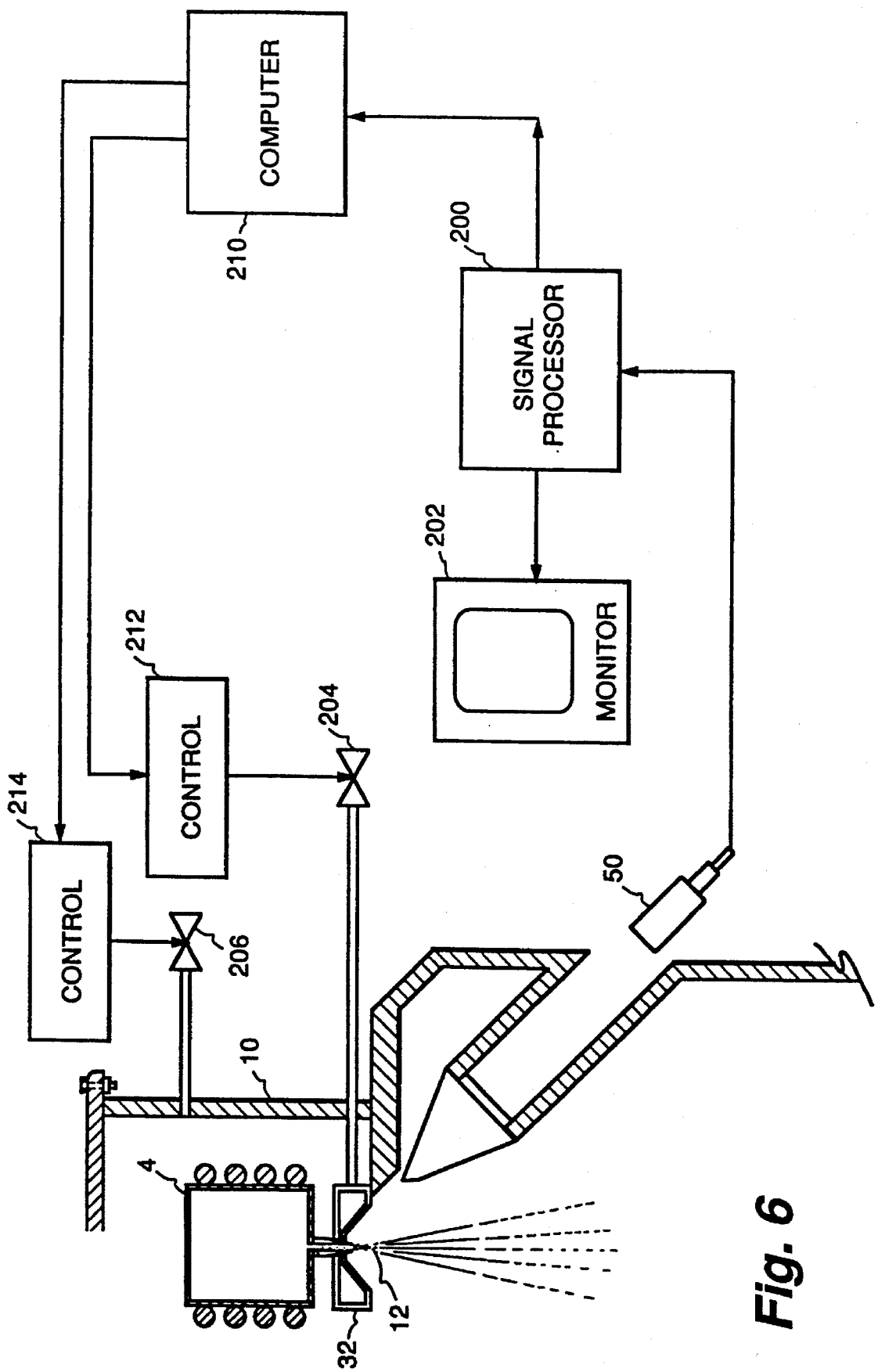

The output signal from the camera 50 can be sent to a computer, or preferably as shown in FIG. 6, to both the video monitor 202 and the computer 210 for example by splitting the signal at the video signal processor 200. The video output signal sent to the computer 210 is converted from analog to digital in the video signal processor 200, for example by a conventional frame grabber card, for example a PC Vision Card and software marketed by Imaging Technology, Inc. for IBM PC-Class computers. Preferably, the video signal processor 200 is mounted in the computer 210.

The computer 210 is preferably configured to compare the information from the video signal processor to a predetermined reference image or images of the atomization zone to determine if there is a deviation larger than a given amount. The computer 210 can be programmed with conventional pattern recognition software to recognize the predetermined reference image or images from the atomizing zone that can be used to control the atomization process. A suitable pattern recognition software is Image Analyst, available from Automatix, Billerica, Mass. If such a deviation exists the computer is used to send control signals to adjust the flow rate of the liquid metal stream in order to bring the sensed image back within the limits of the predetermined reference image or images.

We have discovered that the apparatus of this invention provides images of the atomization process with a resolution that permits identification of characteristics of the atomization process. For example, we have discovered characteristic images that warn of impending freeze-off in the melt guide tube as much as 30 seconds before the freeze-off occurs, allowing sufficient time to selectively adjust the flow rate of the liquid metal stream and prevent the freeze-off. Images of a buildup of solid metal at the exit orifice, or a divergence of the atomized plume axis from the axis extending from the melt guide tube both indicate impending freeze-off in the melt guide tube. As a result, it has now been found that freeze-off is not a sudden unpredictable event, and the method and apparatus of this invention can be used to detect freeze-off warning events to provide for control of the atomization process to prevent the freeze-off.

By using high speed video cameras having a shutter speed of about 0.002 seconds or less to observe the atomization zone through the viewing instrument, a number of additional characteristics of the atomization process were discovered. For example, plumes having a greater spread at a given distance from the exit orifice produce a higher yield of fine particulates, as compared to plumes having a narrower spread at the same distance. In addition, it was found that the gas jet interacts with the liquid metal stream to form a webbing of substantially interconnected ligaments. The ligaments are then further fragmented to form the atomized droplets. Plumes comprised of a higher density of smaller ligaments have an improved yield of fine particulates, as compared to plumes comprised of a lower density of larger ligaments.

Figure 7:
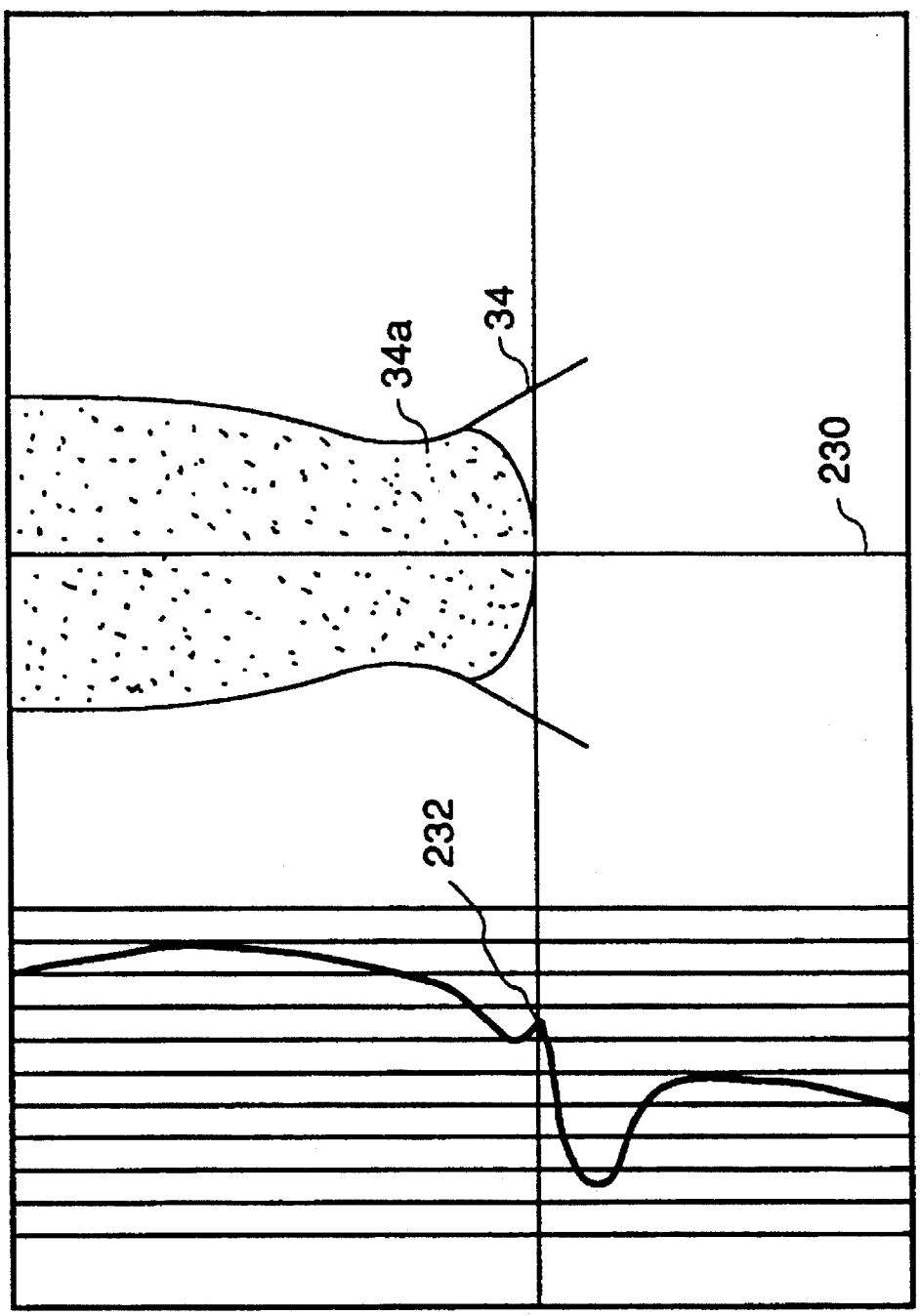
FIG. 7 shows a temperature display of the atomizing zone along a vertical cross section axial to the plume.

When the camera is configured as an imaging radiometer, a thermal profile of the atomizing zone can be imaged. Preferably, a near infrared filter admitting radiation having a wavelength of about 0.8 to 1.1 microns is employed in the imaging radiometer. The video signal output by the camera is proportional to the radiant power flux incident upon the detector in the camera. The video signal from the camera can be displayed on a television monitor resulting in a continuous gray scale depiction of temperature variations of the target. FIG. 7 is a sketch of the imaging radiometer's display, as modified by the Video Analyzer described above. The user positioned cursor 230 is positioned to provide the thermal profile along an axial cross section of the atomizing zone. FIG. 7 shows the signal intensity along the cursor line 230 increases to a sharp peak 232 at the exit orifice 34a of the melt guide tube 34 during atomization. It has been found that when the signal peak 232 at the exit orifice 34a decreases or disappears, it is a warning of impending freeze-off in the melt guide tube 34.

The atomization process can be controlled by selectively adjusting the flow rate of the liquid metal stream directed through the atomizing nozzle. For example, freeze-off in the melt guide tube can be averted by increasing the flow rate of the liquid metal stream. The increased flow rate of the liquid metal stream helps to remove deposits that have solidified in or on the melt guide tube. In addition, the average powder size can be changed by changing the liquid metal flow rate for a given gas flow rate through the nozzle.

Figure 8:
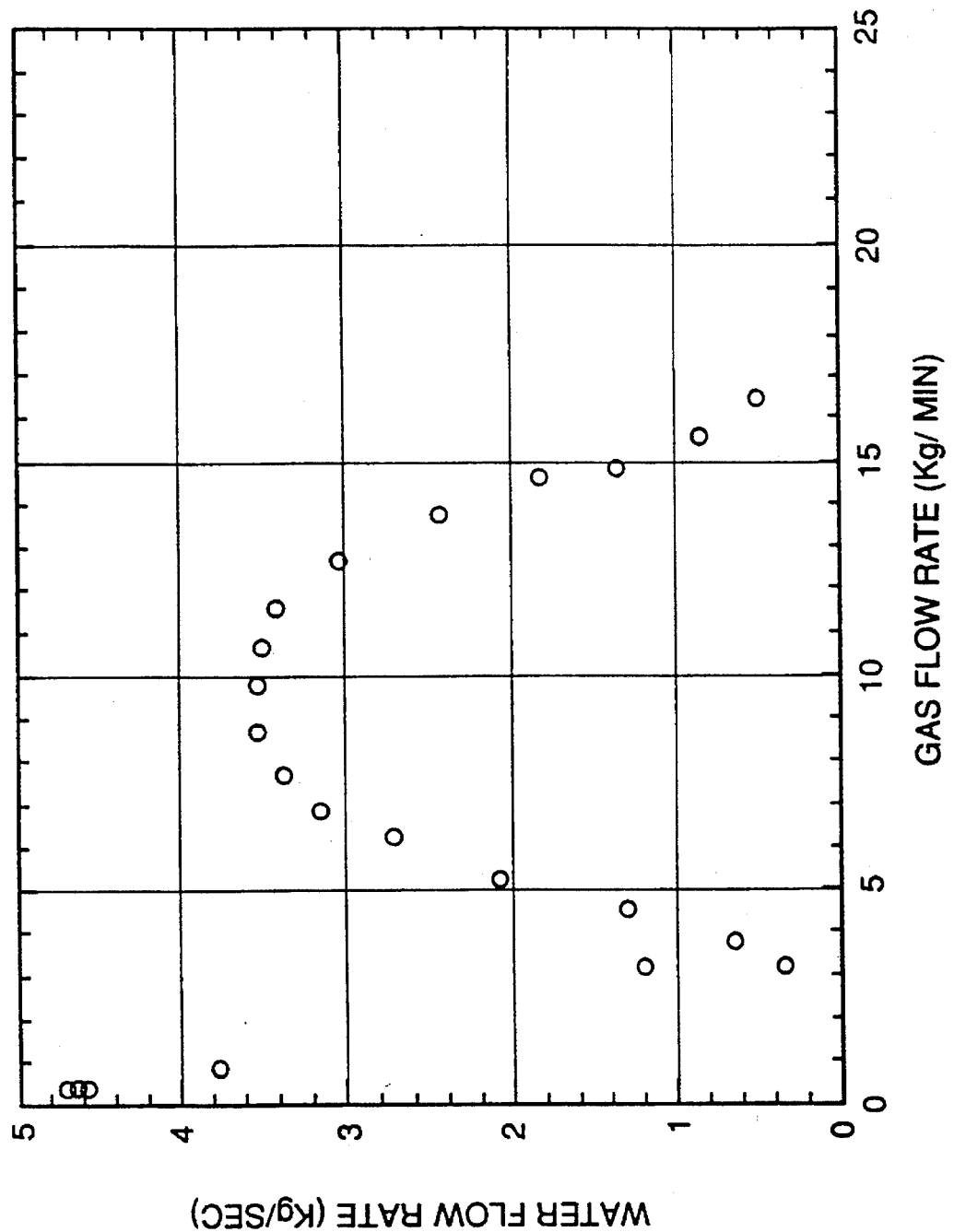
FIG. 8 is a graph showing the flow rate of water from the melt delivery tube as a function of atomizing gas flow rate in an atomizing nozzle.

Referring to FIG. 5, the flow rate of the liquid metal stream can be adjusted by changing the atomizing gas flow rate, or pressure in the plenum 32. Various nozzle configurations having different gas jets, or positioning of the gas jets with respect to the exit orifice on the melt guide tube, provide a unique liquid metal flow rate response as the atomizing gas flow rate changes. For example, FIG. 8 shows the flow rate of water through a nozzle such as shown in FIG. 5, as the atomizing gas flow rate increases. Although FIG. 8 shows the flow rate of water through the nozzle, the flow rate of a liquid metal through the nozzle will follow a similar trend as the atomizing gas flow rate changes.

FIG. 8 shows the maximum liquid flow rate at an atomizing gas flow rate of about 9 to 11 Kg/min. Therefore, when the atomizing gas pressure is above the peak, e.g., 14 kg/min., the atomizing gas pressure is lowered to increase the liquid flow rate through the melt guide tube. When the atomizing gas pressure is below the peak, e.g., 7 kg/min., the atomizing gas pressure is increased to increase the liquid flow rate through the melt guide tube. A first gas supply 204 operatively coupled to a gas inlet in the plenum 32 can be selectively adjusted to increase or decrease the atomizing gas pressure in the plenum in response to the image, e.g. on monitor 202.

In addition, the flow rate of the liquid metal stream can be adjusted by changing the ambient pressure within the crucible enclosure 10. A second gas supply 206 is comprised of a conventional gas supply coupled to a gas inlet in the crucible enclosure 10. The second gas supply 206 is selectively adjusted to increase or decrease the gas pressure in the crucible enclosure 10. For example, the increased gas pressure within the crucible enclosure 10 increases the hydrostatic pressure of the liquid metal within the crucible 4. As liquid metal is poured from the crucible 4 and the depth of liquid metal in the crucible is reduced, reducing the hydrostatic pressure of the melt, the increased gas pressure within the crucible enclosure compensates for the reduced hydrostatic pressure of the melt to increase the flow rate of the liquid metal stream through the melt guide tube.

A first control 212 and second control 214 are coupled to the first and second gas supplies, respectively, for selectively adjusting the gas flow supplied to the plenum 32 and crucible enclosure 10. For example, the controls 212 and 214 can be electric or pneumatic activated valves. The controls can be manually operated in response to the sensed image, for example displayed on video monitor 202. In a preferred embodiment shown in FIG. 6, the controls are coupled to the computer 210, and the control signals from the computer selectively adjust either or both of the controls 212 and 214 to adjust the flow rate of the liquid metal stream in order to bring the sensed image back within the limits of the predetermined reference image or images.

What is claimed is:

1. A method for controlling the atomization zone during an atomization process comprising the steps of:

storing at least one image of at least one reference atomization zone process parameter;

atomizing a stream of a liquid metal having a flow rate with an atomizing fluid in the atomization zone;

viewing the atomization zone with means capable of generating at least one image thereof;

generating at least one image of the atomization zone;

comparing the at least one generated image to the at least one stored image of the at least one process parameter;

determining the amount of deviation of the generated image from the stored image; and when the generated at least one image deviates from the at least one stored image, selectively adjusting the atomization zone such that the atomization zone more closely resembles the stored image of the atomization zone.

2. The method of claim 1 wherein the generated image is a thermal plot of the atomization zone.

3. The method of claim 1 wherein the generated image is a video image of the atomization zone having an exposure time of about 0.002 seconds or less.

4. The method of claim 1 further comprising the step of:

directing the stream through a nozzle comprised of a cylindrical plenum and a melt guide tube extending axially therethrough to an exit orifice, the plenum being configured to provide the atomizing fluid to have a conical shape converging in the stream to form the atomization zone.

5. The method of claim 1 further comprising the steps of:

directing the stream through a nozzle comprised of a cylindrical plenum, and a melt guide tube extending axially therethrough to an exit orifice;

coupling a crucible having a pouring orifice with the melt guide tube;

placing an enclosure for containing an atmosphere over the crucible; and adjusting the flow rate of the stream by a second gas supply coupled with the crucible enclosure to provide a selected atmosphere pressure therein.

6. The method of claim 1 further comprising the steps of:

directing the stream through a nozzle comprised of a cylindrical plenum and a melt guide tube extending axially therethrough to an exit orifice, the plenum being configured to provide the atomizing fluid to have a conical shape converging in the stream;

providing a first gas supply coupled with the plenum such that an atomizing gas pressure is maintained therein;

providing a crucible having a pouring orifice coupled with the melt guide tube; and providing an enclosure for containing a preselect atmosphere over the crucible coupled with a second gas supply for producing an atmosphere pressure therein, such that the flow rate of the stream is adjusted by the first and second gas supplies.

7. A method for controlling the atomization of liquid metal in a close coupled gas atomization apparatus, the method comprising the steps of:

providing an enclosure having a chamber for containing particulates formed from atomized liquid metal;

providing a nozzle, mounted on the enclosure in communication with the chamber, for atomizing the liquid metal, the nozzle including a plenum means and a melt guide tube extending axially therethrough to an exit orifice, the plenum means allowing atomizing gas to converge in an atomization zone extending from the exit orifice;

positioning viewing means in the enclosure for providing a view of the atomization process including the tip of the melt guide tube;

positioning at least one process sensor in the viewing means;

storing images of a plurality of reference atomization process parameters including at least one which indicates impending freeze-off;

monitoring the atomization process with the process sensor;

generating images of the atomization process;

comparing the generated atomization process images to the reference atomization process parameters images;

determining the amount of deviation of the generated atomization process images from the reference atomization process parameters images; and when the generated images of the atomization process deviates from the stored reference atomization process parameter images, changing at least one atomization process parameter thereby resulting in a change of the generated images of the atomization process to coincide with the stored reference atomization process parameter images.

8. The method of claim 7 wherein the viewing means is positioned about 15 degrees to about 60 degrees from the axis of the atomization zone.

9. The method of claim 8 wherein the viewing means is positioned about 30 to about 60 degrees from the axis of the atomization zone.

10. The method of claim 7 wherein the viewing means is positioned about 20 millimeters from the axis of the atomization zone.

11. The method of claim 7 wherein the viewing means is positioned about 20 to about 50 millimeters from the axis of the atomization zone.

12. The method of claim 7 wherein the process sensor is a video camera.

13. The method of claim 7 wherein the process sensor is a pyrometer.

14. The method of claim 7 wherein the process sensor is an imaging radiometer.

15. The method of claim 7 wherein, after determination of the deviation from the at least stored reference atomization process parameter which indicates impending freeze-off, but prior to actual freeze-off, changing at least one atomization process parameter sufficiently to prevent the impending freeze-off.

16. The method of claim 7 wherein, during the image generating step, images of a buildup of solid metal proximate the tip of the melt guide tube are generated about 30 seconds prior to freeze-off occurring.

17. The method of claim 16 further comprising the step of:

after generation of images of the metal buildup proximate the melt guide tube, adjusting the flow rate of the liquid melt stream so that freeze-off is averted.

18. The method of claim 7 further comprising the step of:

comparing the generated images of an atomization plume spread at least one distance from the end of the melt guide tube with the stored images of atomization plume spreads at the same distance from the end of the melt guide tube.

19. The method of claim 18 further comprising the step of:

adjusting the atomization plume spread at the one distance from the end of the melt guide tube such that relatively higher yields of fine particles are produced during the atomization process.

20. The method of claim 7 further comprising the step of:

in response to the generated images, adjusting the atomization apparatus such that a webbing of substantially interconnected ligaments is produced.

21. The method of claim 7 further comprising the step of:

in response to the generated images, adjusting the atomization apparatus to produce an atomization plume having a relatively higher density of smaller ligaments such that a higher yield of fine particles is produced.

22. The method of claim 7 further comprising the step of:

detecting plume temperature variations.

23. The method of claim 22 wherein during the plume temperature variation detection step, the detected temperature at the exit of the stream of liquid metal from the melt guide tube is the peak temperature detected.

24. The method of claim 23 wherein when the detected peak temperature at the exit of the stream from the melt guide tube decreases from the peak temperature detected, freeze-off in the melt guide tube is impending.

25. The method of claim 7 further comprising the step of:

in response to detected deviations in the generated images of the atomization process from the stored reference atomization process parameter images, increasing the flow rate of the liquid melt stream such that freeze-off is averted.

26. The method of claim 7 further comprising the step of:

in response to detected deviations in the generated images of the atomization process from the stored reference atomization process parameter images, increasing the flow rate of the melt such that solid deposits in or on the melt guide tube are at least sufficiently reduced, such that freeze-off is averted.

27. A method for controlling the atomization of liquid metal in a close coupled gas atomization apparatus, the method comprising the steps of:

providing an enclosure having a chamber for containing particulates formed from atomized liquid metal;

providing a nozzle, mounted on the enclosure in communication with the chamber, for atomizing the liquid metal, the nozzle including a plenum means and a melt guide tube extending axially therethrough to an exit orifice, the plenum means allowing atomizing gas to converge in an atomization zone extending from the exit orifice;

positioning viewing means in the enclosure for providing a view of the atomization zone including the tip of the melt guide tube;

positioning at least one process sensor in the viewing means;

storing images of a plurality of reference process parameters;

monitoring the atomization zone with the process sensor;

generating images of the atomization zone including the tip of the melt guide tube;

comparing the generated images of the atomization zone to images of the reference process parameters;

determining the amount of deviation of the generated images from the reference images; and adjusting the atomization apparatus such that a webbing of substantially interconnected ligaments is produced.

28. The method of claim 27 wherein in response to the generated images, adjusting the atomization apparatus to produce an atomization plume having a relatively higher density of smaller ligaments such that a higher yield of fine particles is produced.

* * * * *